United States Patent [19]

Joy et al.

[11] 4,240,299

[45] Dec. 23, 1980

[54] METHOD AND APPARATUS FOR DETERMINING FLUID DENSITY AND MASS FLOW

[75] Inventors: Robert D. Joy; Richard J. Mahany; Glenn A. Thorne; Russell F. Colton, all of Cedar Rapids, Iowa

[73] Assignee: J-Tec Associates, Inc., Cedar Rapids, Iowa

[21] Appl. No.: 111,501

[22] Filed: Jan. 11, 1980

Related U.S. Application Data

[63] Continuation-in-part of Ser. No. 2,644, Jan. 11, 1979, abandoned.

[51] Int. Cl.³ .............................................. G01F 1/32
[52] U.S. Cl. .................................................. 73/861.23
[58] Field of Search .................. 73/24, 30, 32 A, 599, 73/194 VS, 194 M, 339 A

[56] References Cited

U.S. PATENT DOCUMENTS

| | | | |
|---|---|---|---|
| 2,978,899 | 4/1961 | Kritz | 73/24 |
| 3,680,375 | 8/1972 | Joy | 73/194 |
| 3,881,352 | 5/1975 | McShane | 73/194 |

OTHER PUBLICATIONS

Joy "Air Flow Measurement for Engine Control" SAE Paper #760018 2/76.

*Primary Examiner*—Herbert Goldstein
*Attorney, Agent, or Firm*—Griffin, Branigan & Butler

[57] ABSTRACT

This disclosure describes a method and apparatus for using a single sensor to determine the relative velocity between an object and a fluid stream, the average temperature, pressure and/or density of the fluid stream, and thereby the mass flow of the fluid stream. Select properties of a signal, such as a sonic signal, directed through a vortex street are detected using modifications of existing single sensor vortex volumetric flowmeter methods and apparatus. The modifications facilitate the measurement of mass flow by measurements of the relative energy of the signal and the temperature of the fluid as ascertained from the time delay in signal passage from a signal directing means (43) to a signal receiving means (45).

33 Claims, 6 Drawing Figures

METHOD AND APPARATUS FOR DETERMINING FLUID DENSITY AND MASS FLOW

This is a continuation-in-part of Ser. No. 002,644 filed on Jan. 11, 1979 now abandoned.

BACKGROUND OF THE INVENTION

Numerous devices currently exist for measuring the volumetric flow of a moving fluid. Some of these devices employ the Karman vortex-street concept. According to the Karman concept, the erection of an object in a relatively moving fluid creates a fluctuating flow field composed of vortices in the wake of the object. In this regard, the relative movement of the fluid may occur either by passing the object through the fluid or by passing the fluid by an object.

Various attempts have been made to provide a velocity sensor which measures the rate of generation of vortices in the wake of an object. A reliable and relatively simple method and apparatus for velocity sensing which operates on the principle of detecting vortices is disclosed in U.S. Pat. No. 3,680,375 of Joy et al. which is incorporated herein by reference. Basically, the above-cited method determines the rate of generation of vortices by directing a signal through the vortex street at a distance downstream from the object. As the vortices pass through the sonic signal, the pressure differential and mass rotation within each vortex cause an impinging sonic signal to be partially reflected and partially refracted as it passes through the vortex. In other words, when a vortex crosses the signal, energy is scattered by the vortex. Hence, a portion of the directed signal is modulated by a decrease in energy caused by the reflection and refraction. Therefore, measurement of the modulation frequency is a direct measure of the fluid velocity.

Velocity sensors of the vortex-frequency vintage such as the above-referenced patent have been incorporated into flowmeters for measuring a gaseous flow within an enclosure, such as a pipe. In this usage, the velocity sensor is inserted in a body having a known cross-sectional area. When utilizing such a flow meter, the volumetric flow is determined by multiplying the fluid velocity, as measured by the sensor, by the known cross-sectional area of the enclosure.

Although measurement of the volumetric flow of a fluid is useful in numerous fluid mechanical applications, many other applications necessitate the measure of the mass flow of the fluid. The mass flow of a fluid, as distinguished from the volumetric flow, is a product of the volumetric flow, the cross-sectional area of the enclosure, and the density of the fluid medium. Hence, the fluid density must be ascertained.

Although there are many ways to determine fluid density, numerous prior art devices have ascertained fluid density by traversing a sonic signal through the fluid from a signal transmitter to a signal receiver and using the relative energy received as a measure of the fluid density. These devices typically measure the voltage across the sonic signal receiver as an indication of the acoustic impedence of the fluid (which is the product of fluid density and the velocity of sound in the fluid). Prior art devices concerned with the acoustic impedence measurement for density include numerous U.S. patents to Jack Kritz. A non-exclusive citation of mass flowmeter art employing this concept include U.S. Pat. Nos. 3,020,759 and 2,959,054 to Welkowitz; 2,991,650 to Katzenstein; and 3,188,862 to Roth.

In the above regard, no mass flowmeter currently available both determines fluid density by measuring acoustical impedence in the above generally-described manner and determines volumetric flow using the preferred Karman vortex method. Although the possibility of such a flowmeter is alluded to by an applicant herein in an article entitled "Air Flow Measurement for Engine Control" which appeared in the February 1976 issue of the *Society of Automotive Engineers Journal* (SAE Paper Number 760018), no significant embodiment was known or disclosed at the time of that article.

After determining the density of the fluid, the density is often converted to a standard value. The mathematical conversion to a standard value, such as ambient conditions, requires measurement of the temperature of the fluid.

Existing flowmeters, including those utilizing the vortex-frequency concept, employ additional sensors to determine fluid density and temperature. Hence, in these existing meters designed to measure mass flow, one sensor is used to determine the volumetric flow and additional sensors determine the density and temperature parameters.

Numerous disadvantages occur when using multiple sensors to determine the component parameters of mass flow. One practical handicap is the cumbersome additional circuitry which must be engineered into a flowmeter often expected to operate in an small, enclosed environment.

A second problem associated with the employment of multiple sensors is the interference of one sensor with another. The physical proximity of neighboring sensors can spuriously spawn erroneous sonic and electrical components. To minimize interference, prior art devices commonly separate the sensors physically, meaning that the parameters are detected at different locations along the vortex street. For example, a pressure sensor might be placed upstream or downstream of a velocity sensor. Unfortunately, when this sensor positional discrepancy occurs in transient flow conditions, a pressure differential between the separated sensors is ignored. This practice is especially troublesome in rapidly changing flow environments, such as, for example, intake or exhaust gases of an internal combustion engine. Attempts to compensate for the pressure differentials are generally onerous since pressure variations are proportional to the square of velocity.

Considering further the incorporation of multiple sensors into a mass flowmeter, in some structural configurations the presence of an additional sensor along the vortex street can itself cause flowfield modifications in downstream sensing regions.

An additional problem closely akin to the first two is the added expense of additional sensor hardware. Typically the physical construction, mounting, and protection of the actual sensing element is the most costly aspect of a measurement device. Hence, duplicity of these expenses is not economically desirable.

Therefore, it is an object of this invention to provide a new and improved method and apparatus for sensing the mass flow of a fluid.

An advantage of the illustrated embodiments is the utilization of a single sensor for the measurement of volumetric flow, fluid density, and/or fluid temperature, such measurements being spatially made in the same region.

Another advantage of the structure of the invention is that temperature and density can be averaged over a complete signal path length, thus reducing errors due to thermal layering or other temperature or pressure variations.

Still another advantage of the structure of the invention is the realization of substantial cost savings by using a single sensor to perform measurements heretofore performed by a plurality of sensors.

SUMMARY

In accordance with principles of this invention, select properties of a signal, such as a sonic signal, are sensed to determine the temperature, density, pressure, and the velocity and thereby the mass flow, of a fluid stream traversed by the signal. The sensory measurements are conducted using modifications of existing vortex volumetric flowmeter methods and apparatus. The modifications facilitate measurement of mass flow by intermediary measurement of the relative energy of the signal and the time delay in signal passage from a signal directing means to a signal receiving means.

In one embodiment of the above-cited vortex volumetric flowmeter, a vortex strut is mounted in a fluid stream with sonic transducers situated on either side of a resulting wake. One sonic transducer is a directing or transmitting transducer and the other is a receiving transducer. The directing transducer transmits a sonic signal which is modulated by Karman vortices (as discussed above) and detected by the receiving transducer. The modulation frequency of the received signal is a direct measure of the fluid velocity of volumetric flow.

The present invention employs substantially the same structure as existing vortex volumetric flowmeters but, in addition, capitalizes on additional signal characteristics to measure fluid temperature, pressure, and density, these measurements being used in the determination of mass flow.

Regarding the measurement of fluid temperature, which is used to determine density and pressure, the absolute, or Kelvin, temperature $T_k$ is commonly given by the mathematical relationship:

$$C = \sqrt{KRT_k}$$

where C is the speed (meters per second) of sound in the fluid, K is the ratio of specific heat, and R is the universal gas constant. The transit time t of the signal in traversing the distance between the two transducers is a function only of the distance L between the transducers and the speed of sound in the fluid. More precisely, the transient time of the acoustic signal is:

$$t = \frac{L}{C} = \frac{L}{\sqrt{KRT_k}}$$

where K and R are as defined above. Thus, by measuring the transit time t for the signal to traverse the known distance between the transducers, the absolute or Kelvin temperature can be calculated.

The actual measurement of the transit time may be made in several ways. For instance, the signal can be transmitted in a pulse mode so that the delay between the application of energy to the transmitting transducer at a known time and reception thereof by the receiving transducer at a later time can be detected. Alternatively, when transmitting a continuous signal as opposed to a pulse mode, a comparison can be made between the phase of the signal as transmitted and the signal as received to determine the time delay. Similarly, an amplitude or frequency modulation may be imposed on the continuously transmitting sonic signal, with a phase comparison being similarly performed on the modulated signal.

Regarding the measurement of pressure and density, the energy of the received signal is given by the expression:

$$e_o = \left( \frac{4 Z_f Z_T}{[Z_f + Z_T]^2} \right) e^{\frac{-mL}{2}} E_T N \left[ \frac{R_R A_T}{R_T A_R} \right]^{\frac{1}{2}}$$

where
$e_o$ = the energy of the received signal
$Z_f$ = the acoustic impedance of the fluid
$Z_T$ = the acoustic impedance of the transducers
e = standard base of natural logarithm
$E_T$ = voltage applied to the transmitting transducer
m = absorption coefficient of ultrasonic energy in air
L = the spacing between the transducers
N = efficiency of the transducers
$R_R$ = resistance of receiving transducer
$R_T$ = resistance of transmitting transducer
$A_R$ = area of receiving transducer
$A_T$ = area of transmitting transducer With respect to the above expression, $Z_T$ is generally of the order of $30 \times 10^6$ kilograms per meter$^2$ second while $Z_f$ is generally of the order of 400 kilograms per meter$^2$ second. Thus, since $Z_T >> Z_f$, the above expression can be simplified as:

$$e_o = \left( \frac{4 Z_f}{Z_T} \right) e^{\frac{-mL}{2}} E_T N \left[ \frac{R_R A_T}{R_T A_R} \right]^{\frac{1}{2}}$$

For fixed transducer characteristics and applied voltage, W may be defined as:

$$W = \left( \frac{4}{Z_T} \right) E_T N \left[ \frac{R_R A_T}{R_T A_R} \right]^{\frac{1}{2}}$$

so that $e_o$ may now be simplified as:

$$e_o = Z_f e^{\frac{-mL}{2}} W$$

For small transducer spacings, $e(-mL/2)$ is a constant. That is, $$u = e^{\frac{-mL}{2}} \quad (u = \text{constant})$$

so that
$$e_o = Z_f u W$$

or, solving for $Z_f$:

$$Z_f = \frac{e_o}{uW}$$

The impedence of the fluid ($Z_f$) is also the product of the density of the fluid ($\rho$) and the speed of sound in the fluid (C). Thus, equating the two expressions for $Z_f$:

$$\frac{e_o}{uW} = \rho C$$

and solving for density $\rho$ $$\rho = \frac{e_o}{CuW} = \frac{e_o t}{uWL}$$

By appropriate numerical substitution into the above formulae, the density of the fluid may be determined.

Since the mass flow of a fluid is the product of the volumetric flow of the fluid, the cross-sectional area of the fluid stream, and the density of the fluid is previously mentioned, the measurements of fluid temperature, fluid pressure, and fluid density as briefly described above, in conjunction with the measurement of volumetric flow such as that disclosed in the Joy et al. 3,680,375 patent, yield a measurement of the mass flow of the fluid.

Although the above-described measurements may be conducted simultaneously, the methods and apparatus of the invention permit the selective, independent measurement of fluid temperature, pressure, and density, without regard to the volumetric flow.

In using a system comprising a transmitting transducer and a receiving transducer to perform the measurements of volumetric flow of a fluid, the temperature and pressure of the fluid, and/or the density of the fluid, the invention measures at one spatial location the mass flow of a fluid with minimal apparatus and complexity, thereby overcoming the abovediscussed disadvantages of the prior art.

BRIEF DESCRIPTION OF THE DRAWINGS

The foregoing and other objects, features, and advantages of the invention will be apparent from the following more particular description of preferred embodiments as illustrated in the accompanying drawings in which like referenced characters refer to the same parts throughout the various views. The drawings are not necessarily to scale, emphasis instead being placed upon illustrating the principles of the invention.

DESCRIPTION OF THE PREFERRED EMBODIMENTS

Figure 1:
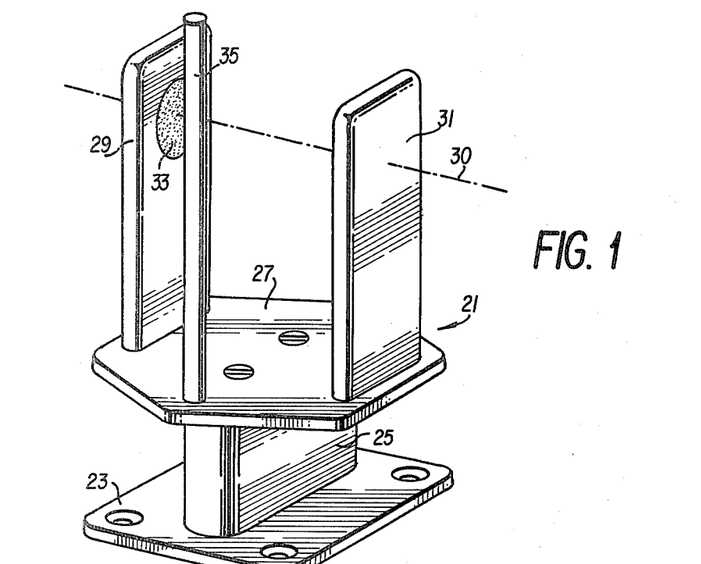
FIG. 1 is a perspective view of a structure suitable for supporting the transducer elements.

FIG. 1 is a pictorial diagram of a structure for mounting sonic transducers in the wake of a vortex strut. It should be understood that, although the present invention is illustrated and discussed with reference to this particular embodiment, this invention is not limited in application to any one specific structural or functional embodiment. Moreoever, as used herein, the term "sonic" means acoustic, ultra-sonic and sub-sonic waves, with ultra-sonic waves being preferred.

The structure illustrated in FIG. 1 comprises a base 21 formed of a base plate 23, a strut 25, and a support plate 27. The base plate 23 supports the strut 25, which is, preferably, in the form of a vertical air foil with respect to the base plate. The support plate 27 is located on top of the strut 25, parallel to the base plate. The base 21 can be formed on three separate components, however, it is preferably formed as a single unit. As illustrated in FIG. 1, the support plate projects outwardly above the strut in a manner somewhat similar to wings.

Projecting upwardly from the support plate 27 at the outer end thereof are first and second transducer struts 29 and 31. The transducer struts include apertures 33 wherein suitable directing means, also referred to as transmitting means, and receiving means, such as sonic directing and receiving transducers, can be mounted, one in each strut. A vortex strut 35 is located in the front of the axis 30 that intersects the apertures of the transducer struts 29 and 31. The vortex strut is illustrated as cylindrical. In crosssection, however, it can take on any suitable form, such as oval, triangular or diamond, for examples.

Figure 2:
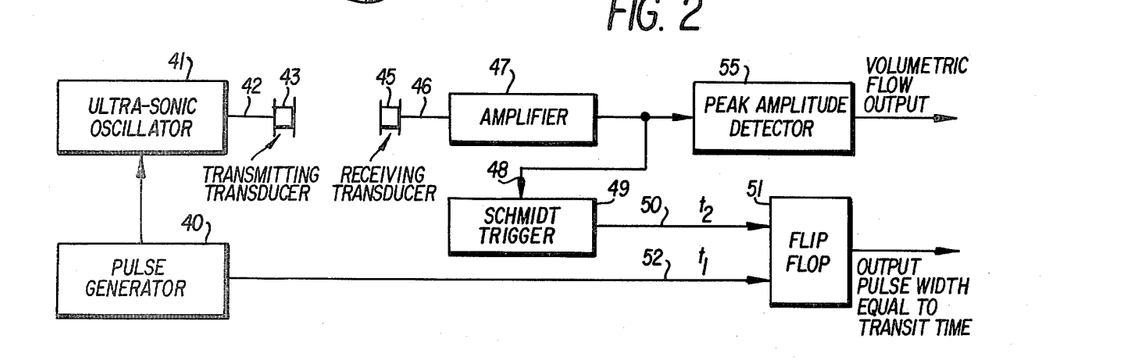
FIG. 2 is a schematic diagram of electronics suitable for a pulsed mode for the measurement of fluid temperature and volumetric flow.
Figure 3:
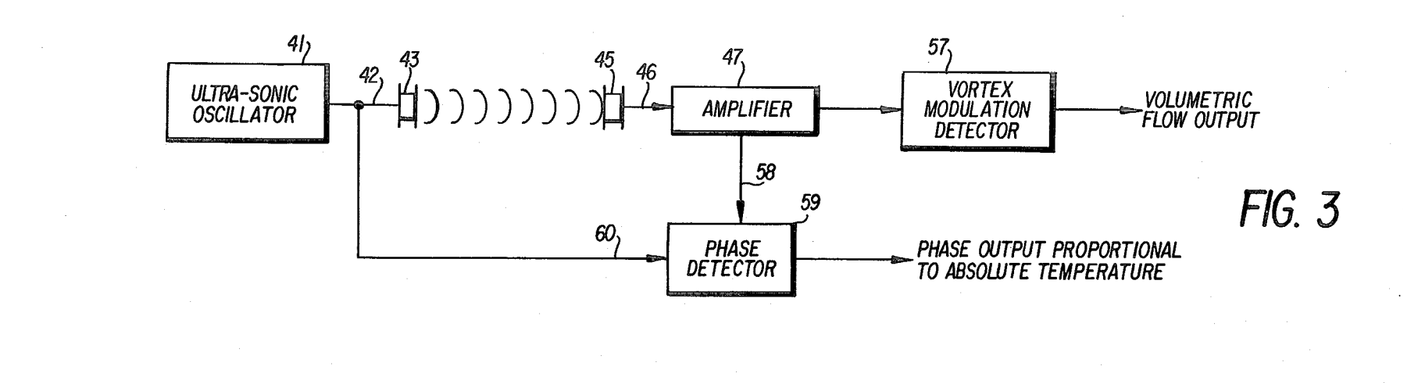
FIG. 3 is a schematic diagram of electronics suitable for a signal phase comparison used in the determination of fluid temperature.
Figure 4:
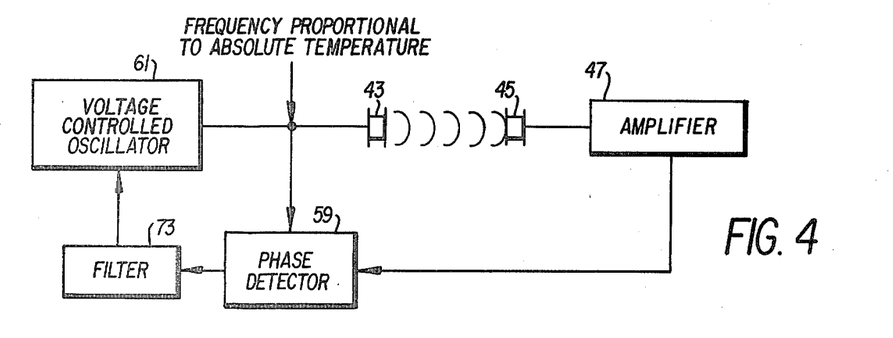
FIG. 4 is a schematic of electronics suitable for a constant phase, controlled-frequency temperature measurement.

FIGS. 2, 3, and 4 are schematic diagrams of electronics suitable for determination of fluid temperature. The respective electronic systems are used, for example, in combination with transducers mounted in the manner illustrated in FIG. 1. As previously explained, fluid temperature is directly related to the speed of sound in the fluid which, in turn, is dependent upon the distance between the transducers and the transit time of the sonic signal traversing the distance between the transducers. Hence, when both the distance between the two transducers and the transit time of the sonic signal traveling therebetween are known, the absolute temperature can be determined from the formulas previously discussed.

FIG. 2 is a schematic diagram of electronics suitable for a pulsed ultra-sonic mode for the measurement of both the volumetric flow and transit time of the sonic signal (and hence the fluid temperature). FIG. 2 comprises: a pulse generator 40; an ultra-sonic oscillator 41; a directing or transmitting transducer 43; a receiving transducer 45; an amplifier 47; a Schmidt trigger 49; a flip-flop 51; and, a peak amplitude detector 55. As previously described with respect to FIG. 1, the directing transducer 43 is mounted on one side of the wake of the vortex strut 35; and the receiving transducer 45 is mounted on the other side of the wake of the vortex strut in the path of the directing transducer signal.

Again with reference to FIG. 2, pulse generator 40 supplies a pulsed signal having a square waveform to the ultra-sonic oscillator 41 which in turn applies the signal, now oscillated, to the transducer 43 via a suitable connecting wire 42. The sonic signal directed by the transducer 43 passes through the wake of the vortex strut 35 and is modulated by the fluctuating flow field formed in the wake of the strut by the generation of a Karman vortex street. The modulated sonic signal is received by the receiving transducer 45 and applied to the amplifier 47 via a suitable connecting wire 46. The amplified signal is, in turn, fed via wire 48 to Schmidt trigger 49. The Schmidt trigger 49 conditions the amplified modulated signal in a square waveform for further transmission via wire 50 to flip-flop 51.

Flip-flop 51 receives input from pulse generator 40 via wire 52 as well as from trigger 49, both inputs being a square waveform. For example, when pulse generator 40 produces a pulse at time $t_1$, flip-flop 51 receives the pulse and initiates its own positive pulse. Meanwhile, the original pulse is being transmitted as above described through elements 41, 43, 45, 47, and 49, arriving at flip-flop 51 at a time $t_2$. At time $t_2$, flip-flop 51 terminates the positive pulse initiated by flip-flop 51 at time $t_1$, thus forming an output pulse having a width which indicates the transit time of the sonic signal.

FIG. 2 also illustrates the measurement of volumetric flow by using the peak amplitude detector 55. This measurement is similar to that performed in the 3,680,375 patent and to that discussed herein with reference to FIG. 2. However, if the pulse rate of the output from amplifier 47 is higher than the highest expected vortex modulation as determined by detector 55; and, the time constant associated with detector 55 is long compared to the pulse rate, but short when compared to the vortex modulation frequency, then the output of detector 55 will be a continuous waveform representing the vortex modulation.

FIG. 3 comprises: an ultra-sonic oscillator 41; a directing or transmitting transducer 43; a receiving transducer 45; an amplifier 47; a vortex modulation detector 57; and a phase detector 59. The ultra-sonic oscillator 41 generates a sonic signal and applies it to the transducer 43 via a suitable connecting wire 42. The sonic signal directed by the transducer 43 passes through the wake of the vortex strut 35 and is modulated in the same manner as described above. The modulated sonic signal is received by the receiving transducer 45 and applied to the amplifier 47 via a suitable connecting wire 46. The amplified signal is, in turn, applied to the vortex modulation detector 57 which can comprise, for example: a demodulator that detects the modulation signal and generates pulses at the modulation frequency, a pulse shaper, and a counter, all such elements as described in U.S. Pat. No. 3,680,375 to Joy et al. The relationship between the count output of the vortex modulation detector 57 and the relative velocity or volumetric flow of the fluid is understood in terms of the Strouhal number formula well known in the prior art and explained by the Joy et al. patent already incorporated herein by reference.

Thus described, FIG. 3 depicts an electronic system for determining the transit time by comparing the phase delay or phase difference between the sonic signal at the transducer 43 and the sonic signal as received at transducer 45. For this purpose, the sonic signal generated from the ultra-sonic oscillator 41 and the amplified modulated signal from amplifier 47 are supplied via suitable connecting wires 58 and 60 to phase detector 59 as inputs for the phase comparison. The phase difference or phase delay is proportional to the absolute temperature of the fluid plus a constant for each configuration which relates the phase angle to transducer spacing at a temperature of absolute zero.

FIG. 4 represents an alternate method for measuring the absolute temperature of the fluid. FIG. 4 comprises: a voltage feed-back controlled oscillator 61; the directing or transmitting transducer 43; the receiving transducer 45; the amplifier 47; the phase detector 59; and a filter 73. As in FIG. 3, the phase detector 59 in FIG. 4 compares the transmitted and received signal phases.

However, FIGS. 3 and 4 differ in that the filtered output of phase detector 59 and filter 73 is applied to the voltage feed-back controlled oscillator 61 so as to maintain a constant phase shift across the transducer spacing. In this configuration, the frequency output of the voltage controlled oscillator 61 is proportional to the average temperature of the fluid and is read as a proportional indicator thereof.

If, in rare instances, the spacing of the transducers in any configuration discussed herein pertaining to the measurement of fluid temperature is large as compared to the wave length of the sonic signal, then certain ambiguities could occur in the above-described time delay measurements. However, these ambiguities can be easily avoided by imposing on the directed signal a modulation whose wave length in the fluid is sufficiently long.

Figure 5:
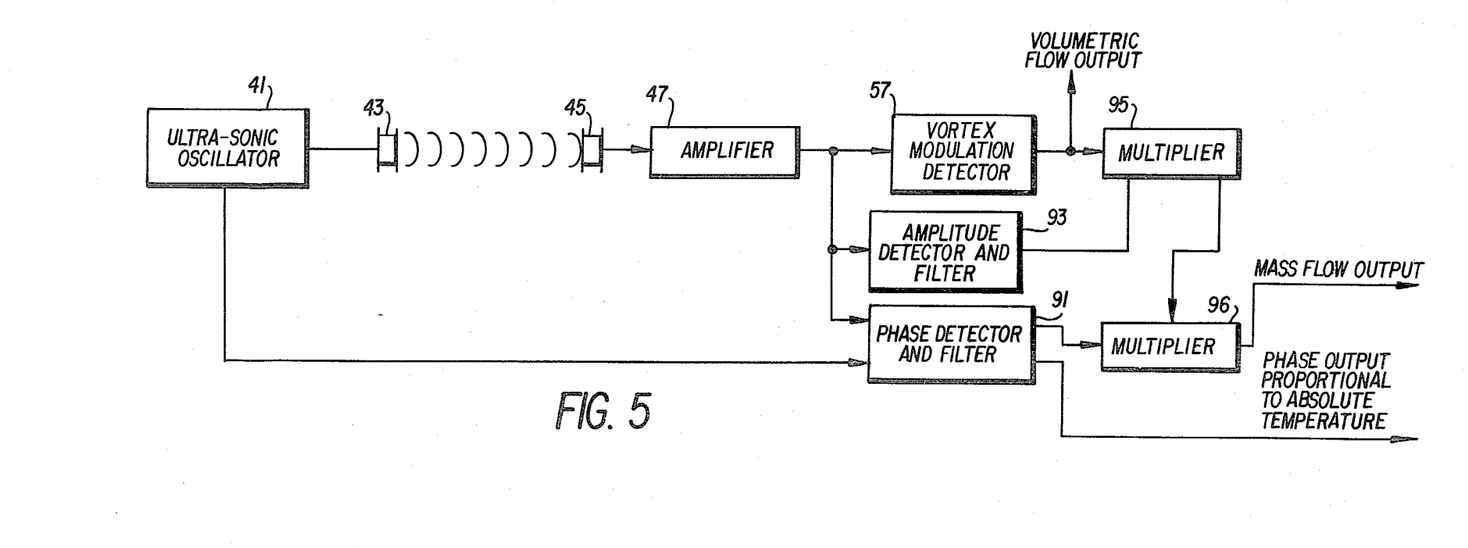
FIG. 5 is a schematic of electronics suitable for volumetric and mass flow outputs as well as temperature and pressure measurement.

FIG. 5 is a schematic diagram of electronics suitable for determination of the volumetric and mass flow outputs as well as temperature measurement. FIG. 5 combines the alternative temperature measuring apparatus and method of FIG. 3 with apparatus and method for determining fluid density. Since the transmission of the sonic energy between the two transducers is a direct function of the fluid density and temperature, a measure of the received sonic energy can be used to define the density parameter. FIG. 5 is one of many possible configurations for performing these measurements and comprises: the ultra-sonic oscillator 41; the directing or transmitting transducer 43; the receiving transducer 45; the amplifier 47; the vortex modulation detector 57; a phase detector and filter 91; an amplitude detector and filter 93; and, multipliers 95 and 96.

Figure 6:
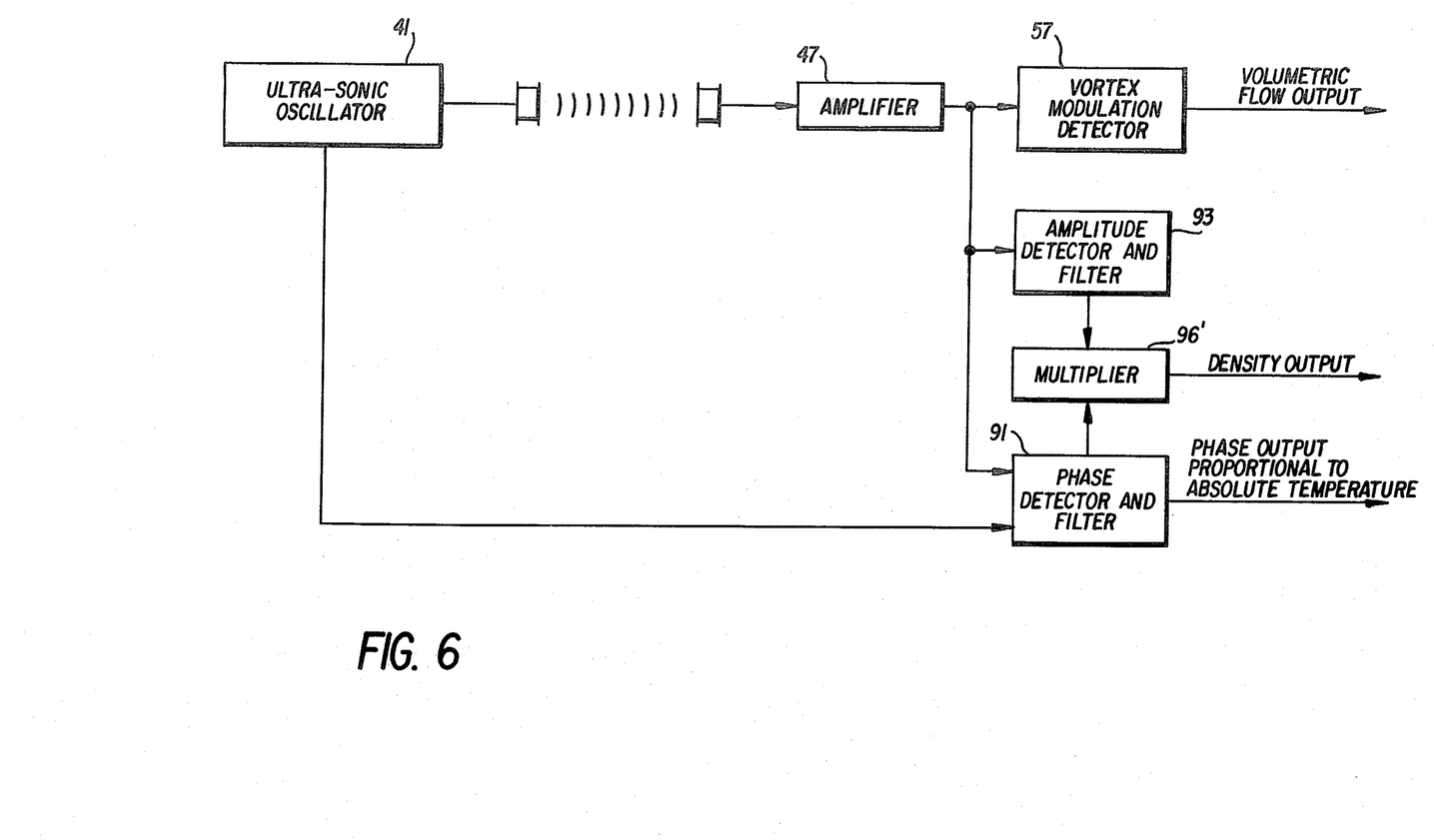
FIG. 6 is a schematic of electronics suitable for temperature, volumetric flow, and density outputs.

FIG. 6 is a schematic diagram of electronics suitable for determination of the volumetric and density outputs as well as temperature measurement. Like FIG. 5, FIG. 6 combines the alternative temperature measuring apparatus and method of FIG. 3 with apparatus and method for determining fluid density. The embodiment of FIG. 6 comprises: the ultra-sonic oscillator 41; the directing or transmitting transducer 43; the receiving transducer 45; the amplifier 47; the vortex modulation detector 57; the phase detector and filter 91; the amplitude detector and filter 93; and, multiplier 96'.

The temperature measurements performed in FIGS. 5 and 6 is similar to the measurement performed in FIG. 3 in that the phase output of phase detector and filter 91 is directly proportional to the transit time t or, conversely, inversely proportional to the absolute temperature $T_k$ of the fluid. It will be appreciated that alternate electronic configurations may be designed within the scope and spirit of the invention such as, for example, the utilization of the electronic systems of FIG. 2 and 4 for temperature measurement.

In FIG. 5 and 6 the received sonic signal, after amplification by amplifier 47, is fed to an amplitude detector and filter 93 which registers the energy amplitude of the received sonic signal. More specifically, the output of the amplitude detector and filter 93 is the term $$\frac{e_o}{uW}$$

which appears in the expression for density cited above. The received sonic signal is also fed from amplifier 47 to the vortex modulation detector 57, the output of which is an indication of volumetric flow.

Reference is made to the embodiment of FIG. 6 which determines, inter alia, density as an output. Since the output of the amplitude detector and filter 93 is to be converted to a standard density value, multiplier 96' multiplies the output detector and filter 93 by the phase output of the phase detector and filter 91, resulting in a product indicative of fluid density.

Reference is now made to the embodiment of FIG. 5 which determines, inter alia, mass flow as an output. Since the fluid mass flow is a mathematical product of the volumetric flow, the cross-sectional area of the fluid stream, and the fluid density, multiplier 95 multiplies the volumetric flow as output from the vortex modulation detector 57 by the $e_o/(uW)$ term which is the output of the amplitude detector and filter 93. Recalling that fluid density $\rho$ is given by the earlier explained expression $$\rho = \frac{e_o t}{uWL},$$

multiplier 96 multiplies the output of multiplier 95 by the term t/L so as to yield an indication of the fluid mass flow. In the above regard, the L term can be obtained by scaling the gain function at either phase detector and filter 91 or multiplier 96.

Throughout the foregoing discussion of the FIGS. it should be understood that various mathematical factors may be introduced into the circuitry as scaling or gain constants. In the instance of the mass computation of the preceding paragraph, for example, the L term can be obtained by scaling the gain function at either phase detector and filter 91 or multiplier 96. Likewise, the cross-sectional area factor may be introduced as by scaling the gain function at either multiplier 95 or multiplier 96.

In the above regard, the K (the ratio of specific heat) and R (Universal Gas Constant) terms may be introduced, for example, as scaling factors in the phase detector and filter 91 of FIGS. 5 and 6 and, the phase detector 59 of FIGS. 3 and 4. In the same manner, the factors U and W in the density formulae may be introduced as scaling or gain factors in the amplitude detector and filter 93 of FIGS. 5 and 6.

The temperature and density measurement methods described above may contain varying components due to the vortex frequency. However, since the vortex frequency is generally large as compared to the fluctuations in either temperature or fluid density, these measurements can be averaged or smoothed to remove the high frequency vortex components.

It will be appreciated by those skilled in the art that the electronic systems illustrated in FIG. 2, FIG. 3, FIG. 4, FIG. 5, and FIG. 6 are merely exemplary and may take on many different, specific forms. The transducer 41 may contain an oscillator whose signal is suitably amplified prior to application to the transmitting transducer 43. In addition, the amplifier 47 may include a suitable preamplifier. The detector 57 may be any one of various types. For example, the detector can be a synchronous demodulator operating at the frequency of oscillation of the transmitter oscillator. Moreover, the pulse output from the detector 57 may be applied to a digital-to-analog converter to obtain an analog output signal, if desired, so that the output signal may be directly applied to an analog indicating instrument.

While the invention has been particularly shown and described with reference to preferred embodiments thereof, it will be understood by those skilled in the art that various changes in form and detail may be made therein without departing from the spirit and scope of the invention. For example, the density measurement performed in FIGS. 5 and 6 may also be performed by utilizing a control voltage generated in a gain controlled amplifier.

The embodiments of the invention in which an exclusive property or privilege is claimed are defined as follows:

1. A method of determining the density of a fluid stream, comprising the steps of:
   generating Karman vortices in the fluid stream;
   directing a signal through the fluid stream toward the Karman vortices which modulate said signal, said signal being directed from a point of direction to a point of reception;
   detecting the modulation frequency of the signal at said point of reception;
   detecting the amplitude of the signal at said point of reception; and,
   using said amplitude as an indicator of said density.

2. The method of claim 1, wherein said signal is a sonic signal.

3. The method of claim 1, wherein said point of direction is a transmitting transducer and said point of reception is a receiving transducer, and wherein said density is related to the amplitude of the received signal by the relationship $$\rho = \frac{e_o t}{\mu WL}$$

where $$W = \left(\frac{4}{Z_T}\right) E_T N \left[\frac{R_R A_T}{R_T A_R}\right]^{\frac{1}{2}}$$

$$\mu = e^{\frac{-mL}{2}}$$

and where
   $\rho$ is the density of the fluid stream
   t is the transit time of the signal from the point of direction of the point of reception
   $e_o$ = the amplitude of the received signal
   $Z_T$ = the acoustic impedance of the transducers
   e = standard base of natural logarithm
   $E_T$ = voltage applied to the transducer
   m = absorption coefficient of ultrasonic energy in air
   L = the spacing between the transducers
   N = efficiency of the transducers
   $R_R$ = resistance of the receiving transducer
   $R_T$ = resistance of the transmitting transducer
   $A_R$ = area of the receiving transducer
   $A_T$ = area of the transmitting transducer.

4. The method of determining the mass flow of a fluid stream, comprising the steps of:
   generating Karman vortices in the fluid stream;
   directing a signal through the fluid stream toward the Karman vortices, said signal being directed from a point of direction to a point of reception;
   detecting the transit time of the signal from the point of direction to the point of reception;
   detecting the presence and number of Karman vortices in the fluid stream as an indication of volumetric flow of the fluid stream;

detecting the amplitude of the signal at said point of reception; and, multiplying the amplitude of the received signal, the volumetric flow, and the transit time of the signal as an indication of the mass flow of the fluid stream.

5. A method of claim 4, wherein said signal is a sonic signal.

6. The method of claim 4, wherein the signal generated is a pulsed signal comprising sequential pulses; and wherein detecting the transit time of the signal from the point of direction to the point of reception includes detection of the time delay between the direction and reception of a pulse.

7. The method of claim 4, wherein detecting the transit time of the signal from the point of direction to the point of reception includes detection of the phase difference between the signal as directed and the signal as received.

8. A method of claim 7, wherein the signal is generated by a feed-back controlled signal generator such that the phase difference between the signal as directed and the signal as received is compared and fed to the controlled generator for the purpose of adjusting and maintaining the frequency of the transmitted signal so that the phase shift of the signal between the point of direction and the point of reception is constant, and such that the frequency of the signal at the point of direction is proportional to the temperature of the fluid stream.

9. The method of claim 4, wherein said transit time is determined by the relationship $$t = \frac{L}{\sqrt{KRT_k}}$$

where t is the transit time of the signal from the point of direction to the point of reception;

$T_k$ is the absolute temperature;

L is the distance between the point of direction and the point of reception;

K is the ratio of specific heat; and,

R is the universal gas constant.

10. A method of determining the density of a fluid stream, comprising the steps of:

generating Karman vortices in the fluid stream;

directing a signal through the fluid stream toward the Karman vortices, said signal being directed from a point of direction to a point of reception;

detecting the transit time of the signal from the point of direction to the point of reception;

detecting the presence of Karman vortices in the fluid stream;

detecting the amplitude of the signal at said point of reception; and, multiplying the amplitude of the received signal by the transit time as an indication of the density of the fluid stream.

11. The method of claim 10, wherein said signal is a sonic signal.

12. A method of determining the density of a fluid stream, wherein:

a vortex strut is located in the fluid stream so that Karman vortices are formed in the wake of the strut; a sonic signal is generated; the sonic signal is directed toward the vortices formed in the wake of the vortex strut so that the vortices modulate the sonic signal; the modulated signal is received; and, the modulating frequency of the received sonic signal is detected; the improvement comprising:

detecting the amplitude of the received sonic signal;

detecting the transit time of the sonic signal from the point of direction to the point of reception;

multiplying the amplitude of the received sonic signal by the transit time of the sonic signal;

using the result of the multiplication as an indication of said density.

13. A method of determing the mass flow of a fluid stream, wherein:

a vortex strut is located in the fluid stream so that Karman vortices are formed in the wake of the strut; a sonic signal is generated; the sonic signal is directed toward the vortices formed in the wake of the vortex strut so that the vortices modulate the sonic signal; the modulated signal is received; and, the modulating frequency of the received sonic signal is detected, the improvement comprising:

detecting the amplitude of the received sonic signal;

detecting the transit time of the sonic signal from the point of direction to the point of reception;

detecting the presence and number of Karman vortices in the fluid stream as an indication of volumetric flow of the fluid stream; and, multiplying the amplitude of the received signal, the volumetric flow, and the transit time of the signal as an indication of the mass flow of the fluid stream.

14. The method of claim 13, wherein the sonic signal generated is a pulsed sonic signal comprising sequential sonic pulses; and wherein detecting the transit time of the sonic signal from the point of direction to the point of reception includes detection of the time delay between the direction and reception of a sonic pulse.

15. The method of claim 13, wherein detecting the transit time of the sonic signal from the point of direction to the point of reception includes detection of the phase difference between the sonic signal as directed and the modulated sonic signal as received.

16. A method of claim 15, wherein the sonic signal is generated by a feed-back controlled sonic signal generator such that the phase difference between the sonic signal as directed and the modulated sonic signal as received is compared and fed to the controlled generator for the purpose of adjusting and maintaining the frequency of the transmitted sonic signal so that the phase shift of the sonic signal between the point of direction and the point of reception is constant, and such that the frequency of the sonic signal at the point of direction is proportional to the temperature of the fluid stream.

17. Apparatus for obtaining information about the density of a fluid stream comprising:

a sonic signal generating means for creating a sonic signal;

a strut mounted so as to be inserted into said fluid, thereby creating a disturbance in said fluid;

sonic signal directing means for directing the sonic signal toward said disturbance so that said disturbance modulates said sonic signal;

sonic signal receiving means for receiving a sonic signal, said sonic signal receiving means mounted so as to receive said modulated sonic signal;

first detecting means connected to said receiving means for detecting the amplitude of said received modulated sonic signal;

second detecting means connected to said directing means and said receiving means for detecting the transit time of the modulated sonic signal as said signal traverses the distance between said directing and receiving means; and, multiplying means for multiplying the amplitude of the received sonic signal by the transit time of the sonic signal.

18. Apparatus for obtaining information about the density of a fluid stream as claimed in claim 17, further comprising means for generating a pulsed sonic signal comprising sequential sonic pulses; and wherein said detection means includes detection of the time delay between the direction and reception of a sonic pulse.

19. Apparatus for obtaining information about the density of a fluid stream as claimed in claim 17, wherein said detection means includes detection of the phase difference between the sonic signal as directed and the modulated sonic signal as received.

20. Apparatus for obtaining information about the density of a fluid stream as claimed in claim 19, further comprising a feed-back controlled sonic signal generator such that the phase difference between the sonic signal as directed and the modulated sonic signal as received is compared and fed to the controlled generator to adjust and maintain the frequency of the directed sonic signal so that the phase shift of the sonic signal between the point of direction and the point of reception is constant, and such that the frequency of the sonic signal at the point of direction is proportional to the temperature of the fluid stream.

21. Apparatus for obtaining information about the mass flow of a fluid stream comprising:

a strut mounted so as to be inserted into said fluid thereby creating a disturbance in said fluid;

sonic signal directing means for directing a sonic signal toward said disturbance so that said disturbance modulates said sonic signal;

sonic signal receiving means for receiving a sonic signal, said sonic signal receiving means mounted so as to receive said modulated sonic signal;

first detecting means connected to said receiving means for detecting the modulation frequency of said received modulated sonic signal;

second detecting means connected to said receiving means for detecting the amplitude of said received modulated sonic signal; and, multiplying means for multiplying the amplitude of the received sonic signal by the modulation frequency of the received sonic signal.

22. Apparatus for obtaining information about the mass flow of a fluid stream as claimed in claim 21, further comprising:

third detecting means connected to said direction means and said receiving means for detecting the transit time of the modulated sonic signal as said signal traverses the distance between said transmitting and receiving means; and, wherein said multiplying means further includes:

second multiplying means for multiplying the amplitude of the received sonic signal, the modulation frequency of the received sonic signal, and the transit time of the sonic signal.

23. Apparatus for obtaining information about the mass flow of a fluid stream as claimed in claim 21, further comprising means for generating a pulsed sonic signal comprising sequential sonic pulses; and wherein said detection means includes detection of the time delay between the direction and reception of a sonic pulse.

24. Apparatus for obtaining information about the mass flow of a fluid stream as claimed in claim 21, wherein said detection means includes detection of the phase difference between the sonic signal as directed and the modulated sonic signal as received.

25. Apparatus for obtaining information about the mass flow of a fluid stream as claimed in claim 24, further comprising a feed-back controlled sonic signal generator such that the phase difference between the sonic signal as directed and the modulated sonic signal as received is compared and fed to the controlled generator to adjust and maintain the frequency of the directed sonic signal so that the phase shift of the sonic signal between the directing means and the receiving means is constant, and such that the frequency of the sonic signal at the point of direction is proportional to the temperature of the fluid stream.

26. A method of obtaining information about the density of a fluid stream comprising the steps of:

creating a disturbance in said fluid by inserting a strut into said fluid;

directing a sonic signal from a transmitting means toward said disturbance so that said disturbance modulates said sonic signal;

receiving said modulated sonic signal at a receiving means;

detecting the transit time of the modulated sonic signal as said signal traverses the distance between said transmitting and receiving means;

detecting the amplitude of the received sonic signal;

multiplying the amplitude of the received sonic signal by the transit time of the sonic signal; and using the result of said multiplication as an indication of said density.

27. A method of obtaining information about the mass flow of a fluid stream comprising the steps of:

creating a disturbance in said fluid by inserting a strut into said fluid;

directing a sonic signal from a transmitting means toward said disturbance so that said disturbance modulates said sonic signal;

receiving said modulated sonic signal at a receiving means;

detecting the modulation frequency of said received sonic signal, detecting the amplitude of the received sonic signal;

detecting the transit time of the modulated sonic signal as said signal traverses the distance between said transmitting and receiving means;

multiplying the amplitude of the received sonic signal, the modulation frequency of the received sonic signal, and the transit time of the sonic signal; and, using the result of said multiplication as an indication of said mass flow.

28. A method of determining a parameter of a fluid stream, comprising the steps of:

generating Karman vortices in the fluid stream;

directing a signal through the fluid stream toward the Karman vortices, said signal being directed from a point of direction to a point of reception;

detecting the modulation frequency of said signal at said point of reception;

detecting the transit time of the signal from the point of direction to the point of reception; and, using said transit time as an indication of said parameter.

29. A method of determining the mass flow of a fluid stream, comprising the steps of:
generating Karman vortices in the fluid stream;
directing a signal through the fluid stream toward the Karman vortices, said signal being directed from a point of direction to a point of reception;
detecting the presence and number of Karman vortices in the fluid stream as an indication of volumetric flow of the fluid stream;
detecting the amplitude of the signal at said point of reception; and,
multiplying the amplitude of the received signal by the volumetric flow as an indication of the mass flow of the fluid stream.

30. A method of claim 8, wherein said signal is a sonic signal.

31. A method of determining a parameter of a fluid stream, wherein:
a vortex strut is located in the fluid stream so that Karman vortices are formed in the wake of the strut; a sonic signal is generated; the sonic signal is directed toward the vortices formed in the wake of the vortex strut so that the vortices modulate the sonic signal; the modulated signal is received; and, the modulating frequency of the received sonic signal is detected; the improvement comprising:
detecting the transit time of the sonic signal from the point of direction to the point of reception; and
using said transit time as an indication of said parameter.

32. A method of determining the mass flow of a fluid stream, wherein:
a vortex strut is located in the fluid stream so that Karman vortices are formed in the wake of the strut; a sonic signal is generated; the sonic signal is directed toward the vortices formed in the wake of the vortex strut so that the vortices modulate the sonic signal; the modulated signal is received; and, the modulating frequency of the received sonic signal is detected; the improvement comprising:
detecting the amplitude of the received sonic signal;
multiplying the amplitude of the received sonic signal by the modulation frequency of the received sonic signal; and
using the result of the multiplication as an indication of said mass flow.

33. A method of determining the mass flow of a fluid stream as claimed in claim 32, the improvement further comprising:
detecting the transit time of the sonic signal from the point of direction toward the vortices to the point of reception.

* * * * *